US009763372B2

(12) United States Patent
Modzik et al.

(10) Patent No.: US 9,763,372 B2
(45) Date of Patent: Sep. 19, 2017

(54) DETACHABLE TILLER TINES

(75) Inventors: Andrew Modzik, Mooresville, NC (US); Matt Lambert, Harrisburg, NC (US); Mark Holloway, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 47 days.

(21) Appl. No.: 14/428,036

(22) PCT Filed: Sep. 13, 2012

(86) PCT No.: PCT/US2012/055027
§ 371 (c)(1),
(2), (4) Date: Mar. 13, 2015

(87) PCT Pub. No.: WO2014/042635
PCT Pub. Date: Mar. 20, 2014

(65) Prior Publication Data
US 2015/0257329 A1 Sep. 17, 2015

(51) Int. Cl.
*A01B 33/02* (2006.01)
*A01B 33/10* (2006.01)
*F02B 63/02* (2006.01)

(52) U.S. Cl.
CPC .......... *A01B 33/028* (2013.01); *A01B 33/021* (2013.01); *A01B 33/103* (2013.01); *F02B 63/02* (2013.01); *Y10T 29/49826* (2015.01)

(58) Field of Classification Search
CPC .............................. A01B 33/02; A01B 33/142
USPC ................................................... 403/1, 364
See application file for complete search history.

(56) References Cited

U.S. PATENT DOCUMENTS

| 1,207,490 | A | * | 12/1916 | Brooks | ................... F02N 1/005 123/185.13 |
| 1,260,690 | A | * | 3/1918 | Liady | ................... E21B 17/046 219/105 |
| 2,229,497 | A | * | 1/1941 | Dontje | ................... A01B 45/02 172/104 |

(Continued)

FOREIGN PATENT DOCUMENTS

| JP | 2000060209 A | 2/2000 |
| JP | 2005006531 A | 1/2005 |

(Continued)

OTHER PUBLICATIONS

Troy-Bilt, "Troy-Bilt Mini Tiller", pp. 18 and 19, http://dl.owneriq.net/9/9607ca33-a6ee-41d7-89ea-78a8d137450c.pdf.

(Continued)

*Primary Examiner* — Gary Hartmann
(74) *Attorney, Agent, or Firm* — McNair Law Firm, P.A.

(57) ABSTRACT

A tiller includes an engine, a mobility assembly, and a rotating assembly. The mobility assembly is operably coupled to the engine to provide mobility of the tiller responsive to operation of the engine. The rotating assembly is selectively coupled to the engine to provide rotation of the rotating assembly. The rotating assembly includes a rotatable shaft configured to turn when the rotation assembly is operably coupled to the engine, and one or more sets of tines disposed on respective tine assemblies. Each of the tine assemblies includes a hollow shaft for receiving the rotatable shaft. The one or more sets of tines extend radially outward from the respective tine assemblies.

20 Claims, 5 Drawing Sheets

(56) References Cited

U.S. PATENT DOCUMENTS

| | | | |
|---|---|---|---|
| 3,123,149 A | 3/1964 | White | |
| 3,195,393 A * | 7/1965 | Uozumi | F16B 21/12 411/513 |
| 4,062,408 A | 12/1977 | Enters et al. | |
| 4,123,199 A * | 10/1978 | Shimizu | F01D 5/066 416/198 A |
| 4,142,586 A | 3/1979 | Miner | |
| 4,171,725 A | 10/1979 | Saugstad | |
| 4,256,184 A * | 3/1981 | Squibb | A01B 23/06 172/531 |
| 4,279,275 A * | 7/1981 | Stanwood | B29C 70/86 138/109 |
| 4,802,536 A | 2/1989 | O'neal | |
| 5,520,253 A | 5/1996 | Kesting | |
| 5,662,446 A * | 9/1997 | Haan | F16B 21/125 411/514 |
| 5,934,382 A * | 8/1999 | Wilkins | A01B 39/08 172/460 |
| 6,352,385 B1 * | 3/2002 | Wojciechowski | F16D 1/033 403/364 |
| 6,367,561 B1 * | 4/2002 | Firdaus | A01B 33/103 172/123 |
| 6,416,415 B1 * | 7/2002 | Yu | F16D 1/101 403/13 |
| 6,607,040 B2 | 8/2003 | Skjaeveland | |
| 6,705,807 B1 * | 3/2004 | Rudolph | B23B 51/0426 279/143 |
| 6,855,061 B2 * | 2/2005 | Simboli | F16D 1/068 228/135 |
| 7,172,032 B2 | 2/2007 | Mckinley et al. | |
| 7,237,620 B2 * | 7/2007 | Abenroth | A01B 33/028 172/15 |
| 7,306,275 B2 * | 12/2007 | Kalous | B60D 1/06 296/1.07 |
| 7,588,090 B2 | 9/2009 | Dairon | |
| 7,963,344 B2 * | 6/2011 | Marcil | A01B 33/028 172/354 |
| 8,162,072 B2 * | 4/2012 | Marcil | A01B 33/028 172/125 |
| 8,573,909 B2 * | 11/2013 | Hecht | B23B 27/007 279/8 |
| 8,607,889 B2 * | 12/2013 | Marcil | A01B 33/028 172/42 |
| 8,627,897 B2 * | 1/2014 | Marcil | A01B 33/082 172/42 |
| 2006/0243463 A1 | 11/2006 | Mensch | |
| 2009/0065221 A1 | 3/2009 | Vaughn et al. | |
| 2009/0200049 A1 * | 8/2009 | Carr | A01B 29/04 172/1 |

FOREIGN PATENT DOCUMENTS

| | | |
|---|---|---|
| JP | 2005143407 A | 6/2005 |
| JP | 2010172310 A | 8/2010 |

OTHER PUBLICATIONS

Echo, "Echo Tiller/Cultivator", p. 22, http://www.echo-usa.com/getattachment/ac6fa5b6-632b-4fb3-9a50-8f6ed575ef66/TC210es12_021012.pdf.

International Search Report and Written Opinion of PCT/US2012/55027 mailed on Dec. 7, 2012, all enclosed pages cited.

Chapter I of the International Preliminary Report on Patentability of PCT/US2012/055027, issued on Mar. 17, 2015, all enclosed pages cited.

American Honda Motor Co., Inc., "Honda Mini Tiller FG-100", 1997, 2003, all enclosed pages cited.

* cited by examiner

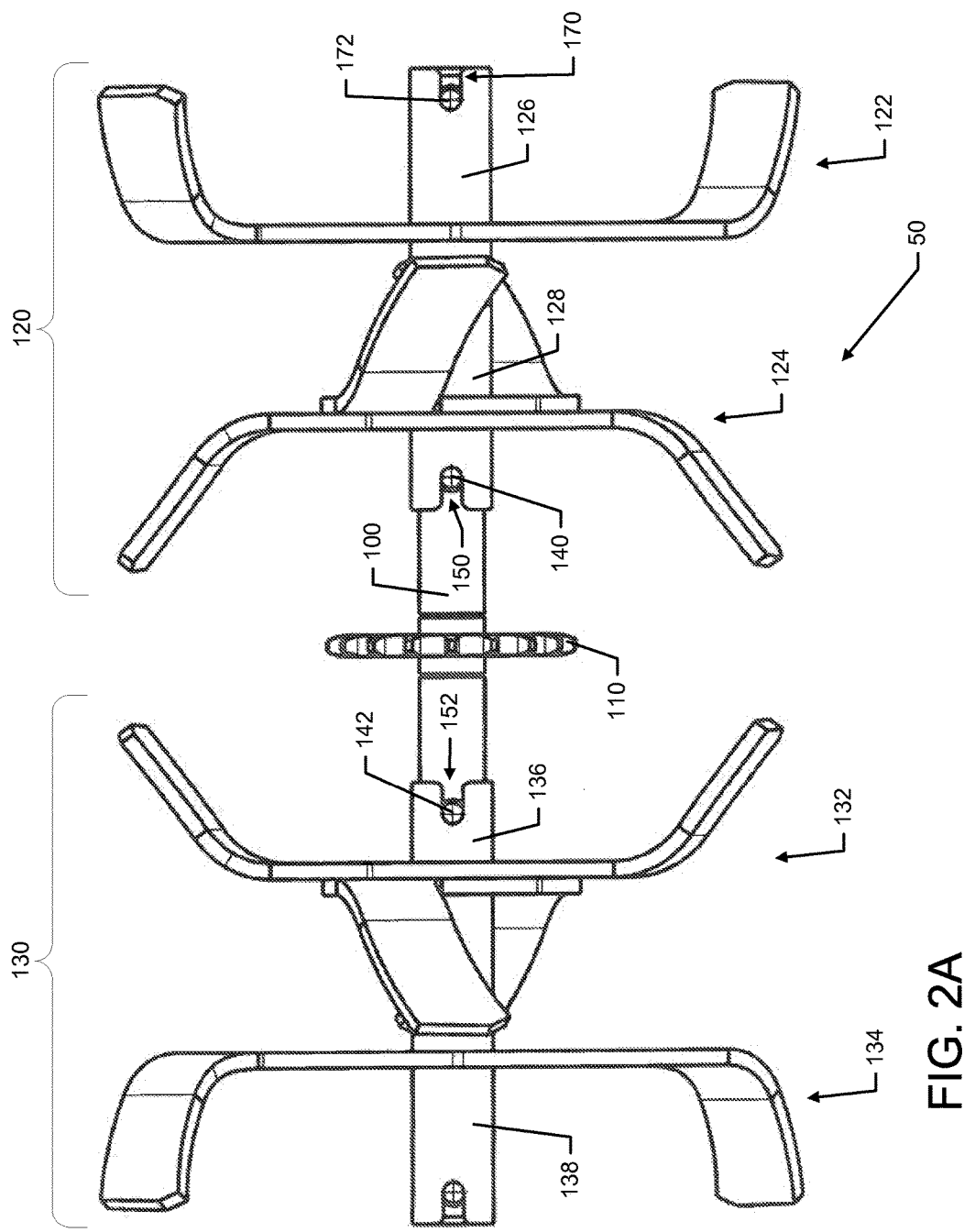

DETACHABLE TILLER TINES

TECHNICAL FIELD

Example embodiments generally relate to outdoor power equipment and, more particularly, relate to tiller with detachable tines.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers that may be mounted on riding or walk behind devices. Other tasks, like lawn mowing may be performed by riding or walk behind lawn mowers. Still other tasks, such as tilling, trimming and/or the like may also be employed by either riding or walk behind devices. Moreover, in some cases, such tasks may be performed using hand held power equipment.

One common type of tiller, or cultivator, employs some form of rotating assembly that is configured to stir, pulverize or otherwise break up the ground that is encountered thereby in order to loosen the soil, aerate the soil and alleviate soil compaction. Loosened soil may be more easily augmented with fertilizer and may also be more easily planted. Tilling might also convert a patch of soil that is currently covered with undesirable plants into a seed ready patch that can be prepared for conversion into a more useful agricultural purpose.

It is often desirable to control the depth to which the ground is tilled, stirred or pulverized. Thus, the rotating assembly may be configured to be rotated while encountering the soil down to a predefined depth. The rotating assembly may include teeth or disks that are turned through their interaction with the soil. When teeth are employed, they may be referred to as tines.

The rotation of the tines through the soil tends to break up the soil and also uproot any rooted plants that are encountered. For smaller plants, the uprooting action may simply kill the plant and discard the uprooted plant as the rotating assembly continues to turn. However, for larger plants that may have more developed or larger root systems, it is possible for the roots to become tangled in the tines of the rotating assembly. If the tangling of roots within the tines of the rotating assembly becomes significant, the effectiveness of the rotating assembly relative to tilling the ground may be reduced. In extreme cases, the rotation of the rotating assembly may even be inhibited. This phenomenon may cause the operator to need to stop tilling from time to time in order to clear obstructions from the rotating assembly. In many cases, clearing obstructions from the tines may be difficult to do. The operator may need to employ tools to cut through roots and pull them out of the tines manually. Meanwhile, the operator may need to be bent over or tip the tilling machine on its side to get at the problem to attempt to fix it. Even so, the operator may be limited to only one direction from which to attempt to reach obstructions with any degree of effectiveness since the tiller tines may remain fixed to the rotating assembly and the shaft that turns the assembly. This may increase the time it takes to cultivate and may reduce the efficiency of operation while also decreasing operator satisfaction.

BRIEF SUMMARY OF SOME EXAMPLES

Some example embodiments may therefore provide a rotating tine assembly that can be more easily cleared of obstructions. In this regard, for example, some embodiments may provide a detachable rotating assembly for a tiller. The detachable rotating assembly may allow the tiller tines to be easily removed from a rotatable shaft so that the operator can clear obstructions more easily. Moreover, in some cases, a single removable pin may be provided to hold the tiller tines to the rotatable shaft. The pin, which in some cases may be removed without the use of any tools, may be relatively easy to remove so that the rotating assembly itself can be removed and the operator may clear the tines of obstruction with access to any part of the assembly.

In one example embodiment, a tiller is provided. The tiller may include an engine, a mobility assembly and a rotating assembly. The mobility assembly may be operably coupled to the engine to provide mobility of the tiller responsive to operation of the engine. The rotating assembly may be selectively coupled to the engine to provide rotation of the rotating assembly. The rotating assembly may include a rotatable shaft configured to turn when the rotation assembly is operably coupled to the engine, and one or more sets of tines disposed on respective tine assemblies. Each of the tine assemblies may include a hollow shaft for receiving the rotatable shaft. The one or more sets of tines may extend radially outward from the respective tine assemblies.

In another example embodiment, a rotating assembly for working ground responsive to operation of a tiller when the rotating assembly is selectively coupled to an engine of the tiller is provided. The rotating assembly may include a rotatable shaft configured to turn when the rotation assembly is selectively coupled to the engine, and one or more sets of tines disposed on respective tine assemblies. Each of the tine assemblies may include a hollow shaft for receiving the rotatable shaft. The one or more sets of tines may extend radially outward from the respective tine assemblies.

In another example embodiment, a method of providing a tiller with removable tine assemblies is provided. The method may include providing selective coupling between an engine of the tiller and a rotatable shaft on which a rotating assembly that works ground over which the tiller passes responsive to rotation of the rotatable shaft and providing a sleeve portion of the rotating assembly to receive the rotatable shaft. The sleeve portion may have one or more sets of tines extending radially outward therefrom. The method may further include enabling one end of the sleeve portion to be fixed relative to the rotatable shaft and an opposite end of the sleeve portion to be selectively fixed to the rotatable shaft such that the sleeve portion is alternately fixable and releasable relative to the rotatable shaft without requiring a tool.

Some example embodiments may improve the ability of operators to maintain the tiller tines in a clear and effective condition to improve performance and operability of a tiller or cultivator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A illustrates a side view of a rotating assembly of the walk behind tiller according to an example embodiment;

DETAILED DESCRIPTION

Figure 1:
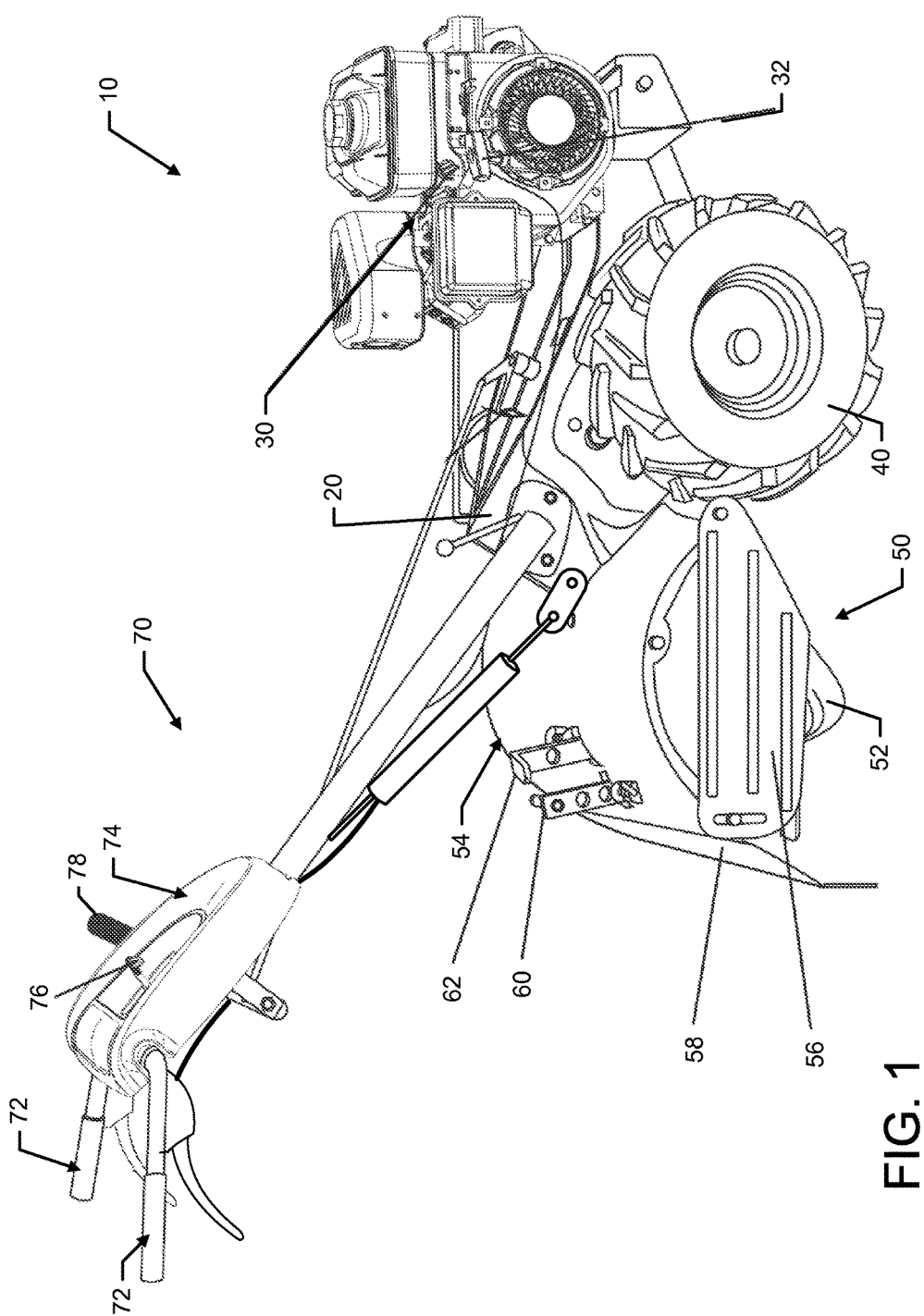
FIG. 1 illustrates a side perspective view of a walk behind tiller according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve an operator's experience associated with operating a tiller, cultivator, and/or the like. In this regard, some embodiments may generally improve the operator's ability to maintain the tines of the tiller in an operable condition in which they are not fouled or obstructed with vegetation and/or roots. To provide such improvement, some embodiments may employ a rotatable shaft to which a rotating assembly may be mounted. The rotating assembly may have a plurality of tines attached thereto in any desirable configuration. The rotating assembly may be relatively easily removable from the rotatable shaft based on the operation of a removable pin. The pin may hold the rotating assembly in place on the rotatable shaft when the pin is installed, and may allow the rotating assembly to be removed from the rotatable shaft when the pin is removed. In some cases, the pin may be removed without the use of tools so that the operator can easily remove the rotating assembly and clear obstruction or fouling of the tines.

FIG. 1 illustrates a side view of a walk behind tiller 10 according to an example embodiment. Although the walk behind tiller 10 of FIG. 1 is illustrated and will primarily be described herein, it should be appreciated that example embodiments may also be practiced in connection with any other types of tillers or cultivators as well. For example, other embodiments may also be practiced in connection with tractor mounted tillers or cultivators as well. Thus, the descriptions provided herein relative to a walk behind tiller should be appreciated as being non-limiting examples.

The tiller 10 may include a chassis or frame 20 to which various components of the tiller 10 may be attached. The frame 20 may support an engine 30, such as a gasoline powered engine. Operation of the engine 30 may be initiated by a recoil starter via pulling of a recoil starter handle 32 by the operator. However, in other embodiments, tillers may alternatively be started via a key, switch or other similar device.

The tiller 10 may include wheels 40 or continuous tracks forming a mobility assembly on which a substantial portion of the weight of the tiller 10 may rest, when the tiller 10 is stationary. The wheels 40 or continuous tracks may also provide for mobility of the tiller 10. In some cases, the mobility assembly may be driven via power from the engine 30. However, in other cases, the mobility assembly may simply provide for mobility of the tiller 10 responsive to pushing by the operator.

The tiller 10 may also include a rotating assembly 50. In this example, the rotating assembly 50 includes a plurality of tines 52 that are configured to work, or dig up, the ground responsive to rotation of the set of tines 52 by operable coupling to the engine 30. The operable coupling of the set of tines 52 to the engine 30 may be selectively engaged and/or disengaged (e.g., via a clutch, a series of belts/pulleys, a friction wheel or other similar devices). In some embodiments, selective engagement to operably couple the set of tines 52 to the engine 30 may be facilitated via coupling of rotary motion provided by the engine 30 to a rotatable shaft on which the set of tines 52 is mounted. This coupling may be provided by a chain, belt or other such assembly.

On the tiller 10, the set of tines 52 may be housed within a shroud 54 including side panels 56 and a leveling shield 58. The shroud 54 may prevent or inhibit dirt and debris from being expelled from the vicinity of the set of tines 52 and toward the operator or other people or objects nearby. The tiller 10 may also include a depth stake 60 and a drag stake 62 to facilitate operation of the tiller 10. Some embodiments may not employ the shroud 54, side panels 56 and/or the leveling shield 58.

In an example embodiment, a handle assembly 70 may extend rearward and upward from the frame 20 above the shroud 50 in order to enable the operator to engage the handle assembly 70 and operate the tiller 10 while walking behind the tiller 10 (e.g., at the operator station). The handle assembly 70 may include a handle apparatus 72, which may include a handlebar or handles (as shown in FIG. 1). In some embodiments, a control panel 74 may also be positioned proximate to the handle apparatus 72 to provide speed and/or other engine controls (e.g., via throttle control 76 and/or shift lever 78). Alternatively or additionally, the control panel 74 may host other functional controllers for operation of the tiller 10. However, the control panel 74 may be eliminated or serve other functions in other example embodiments. The handles or handlebar employed in connection with the handle apparatus 72 may, in some cases, include one or more levers, bails or other movable control members that can be grasped by the operator while the operator simultaneously grasps the handle apparatus 72. These levers, bails or other movable control members may be operated for engagement of the rotating assembly 50 or for other control functions that impact operation of the walk behind power equipment device.

Figure 2B:
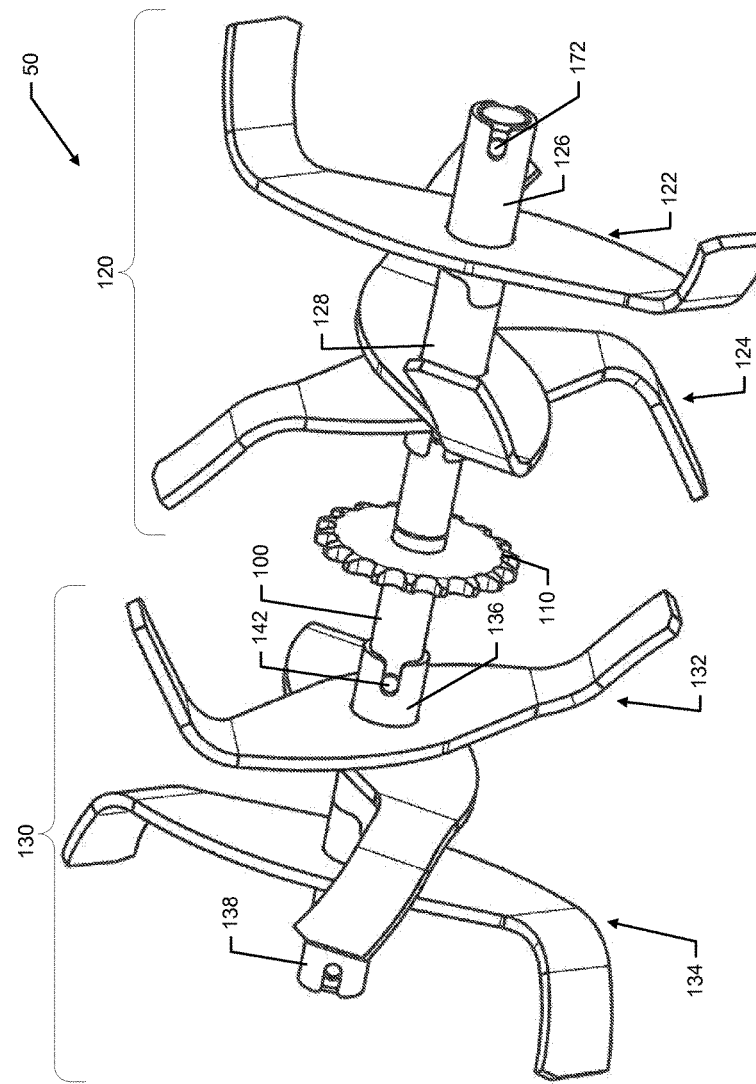
FIG. 2B illustrates a perspective view of the rotating assembly of the walk behind tiller according to an example embodiment.
Figure 3:
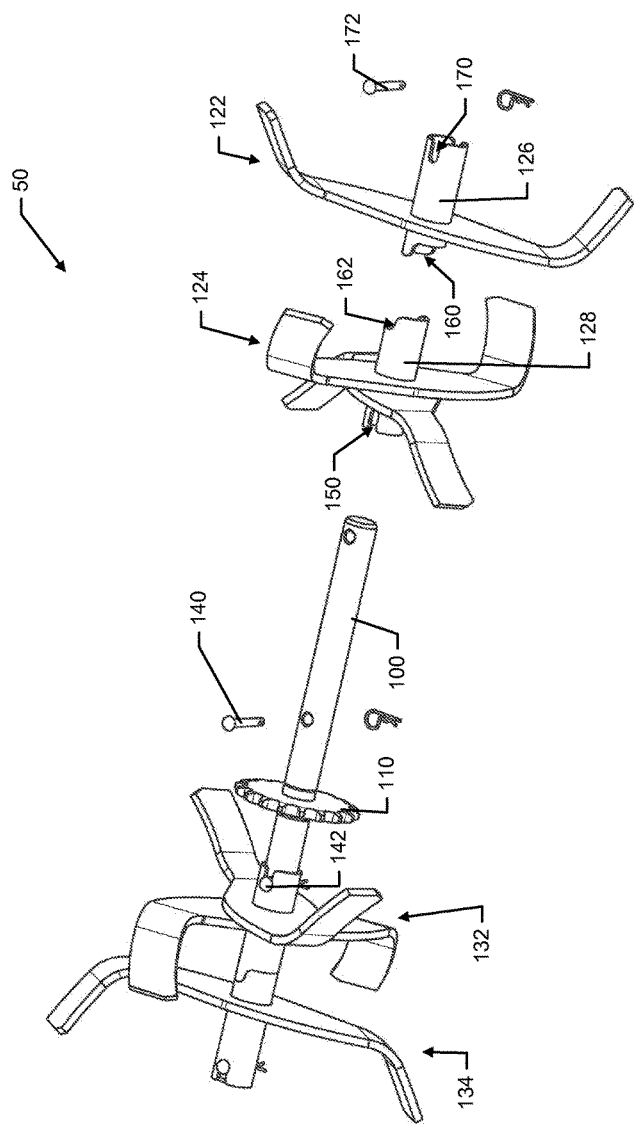
FIG. 3 illustrates a partially exploded perspective view of the rotating assembly according to an example embodiment.

As indicated above, some example embodiments may provide for relatively easy removability of the rotating assembly 50 in order to facilitate cleaning and maintenance thereof. FIG. 2, which includes FIGS. 2A and 2B, illustrates the rotating assembly 50 of an example embodiment in greater detail while in an operational or assembled state. In this regard, FIG. 2A illustrates a side view of the rotating assembly 50 and FIG. 2B illustrates a perspective view of the rotating assembly according to an example embodiment. Meanwhile, FIG. 3 shows the rotating assembly 50 in a non-operational or partially disassembled state which may facilitate clearing any fouling or obstruction that may inhibit operation of the tiller 10. In this regard, FIG. 3 illustrates a partially exploded perspective view of the rotating assembly 50 according to an example embodiment. It should be noted that the example of FIGS. 2 and 3 relates to one particular arrangement of a rotating assembly 50 having six distinct sets of tines (e.g., three on each side of the center of the rotating assembly 50). However, it should be appreciated that any number of sets of tines may be employed and they may be oriented and/or arranged in any number of different ways.

Referring now to FIGS. 2 and 3, the rotating assembly 50 may include a rotatable shaft 100. The rotatable shaft 100 may be a single rigid member (e.g., a single rod, tube, bar, beam, shaft or other linearly extending component) extending transversely from one side of the tiller 10 to the other (e.g., substantially parallel to the axle between wheels 40 and substantially perpendicular to the general direction of travel of the tiller 10). In some embodiments, the rotatable shaft 100 may be made of multiple parts that are fitted or otherwise fixed together. Thus, it is not necessary that the rotatable shaft 100 be made from a single member. Furthermore, although FIGS. 2 and 3 illustrate the rotatable shaft 100 as having a substantially cylindrical structure such that a cross section view perpendicular to the longitudinal axis of the rotatable shaft 100 presents a circular shape, it should be appreciated that the rotatable shaft 100 could take any suitable shape. Thus, in some embodiments, a cross section view perpendicular to the longitudinal axis of the rotatable shaft 100 may present a square, octagonal, hexagonal, or any other desired shape in some embodiments.

In an example embodiment, the rotatable shaft 100 may include a sprocket 110, which may couple to a chain (not shown) that can be selectively coupled to the engine (e.g., engine 30 of FIG. 1) of the tiller 10 for rotation of the rotatable shaft 100. For example, a clutch may be engaged in order to transfer engine rotation to the rotatable shaft 100 via movement of the chain being coupled to the rotatable shaft 100 by the sprocket 110. In this example, the sprocket 110 is located at a center portion of the rotatable shaft 100. However, it is not necessary that the sprocket 110 be centrally located in all embodiments. Thus, the sprocket 110 could be disposed spaced apart from the center of the rotatable shaft 100 or even at or near an end of the rotatable shaft 100. Furthermore, in some embodiments, multiple sprockets and corresponding multiple chains may be employed.

In some embodiments, the rotating assembly 50 may include multiple sub-assemblies. In the example of FIGS. 2 and 3, the rotating assembly 50 includes one sub-assembly on each side of the sprocket 110 and the sub-assemblies may substantially mirror each other. Each sub-assembly (e.g., a first sub-assembly 120 and a second sub-assembly 130) may further include one or more tine assemblies that may be arranged to engage each other for mutual support such that the engagement occurs proximate to the rotatable shaft 100. For example, a first tine assembly 122 and a second tine assembly 124 may form the first sub-assembly 120. Meanwhile, a third tine assembly 132 and a fourth tine assembly 134 may form the second sub-assembly 130.

The tine assemblies may each include one or more tine sets. For example, the first tine assembly 122 includes a single tine set formed by a single elongate member being extended radially outward away from the rotatable shaft 100. The single tine set forming the first tine assembly 122 may include bent portions forming teeth at opposing ends of the tine set, with the bent portions being bent outwardly relative to the center of the rotatable shaft 100 at which the sprocket 110 is located. Meanwhile, the second tine assembly 124 includes two tine sets, each of which is formed by a respective single elongate member being extended radially outward away from the rotatable shaft 100. Each of the tine sets forming the second tine assembly 124 may include bent portions forming teeth at respective opposing ends of the tine sets. In this example, one of the tine sets may have teeth bent outwardly away from the direction of the sprocket 110, while the other one of the tine sets may have teeth bent inwardly toward the direction of the sprocket 110.

As indicated above, the second sub-assembly 130 may substantially mirror the first sub-assembly 120 so the corresponding structures of the third tine assembly 132 and the fourth tine assembly 134 may mirror the description above with the third tine assembly 132 mirroring the second tine assembly 124 and the fourth tine assembly 134 mirroring the first tine assembly 122.

In an example embodiment, the elongate members forming the tine assemblies (e.g., first tine assembly 122, second tine assembly 124, third tine assembly 132, and fourth tine assembly 134) may each extend radially outwardly from a sleeve portion that may engage or otherwise lie proximate to the rotatable shaft 100 when the respective sub-assemblies are operational. Moreover, in some cases, at least the portion of the elongate members forming the tine assemblies that contact the respective sleeve portions may extend substantially perpendicularly away from the corresponding sleeve portions. As shown in FIGS. 2 and 3, the elongate member of the first tine assembly 122 may extend radially away from sleeve portion 126 while elongate members of the second tine assembly 124 extend radially away from sleeve portion 128. The elongate members of the third tine assembly 132 extend radially away from sleeve portion 136 while the elongate member of the fourth tine assembly 134 extends radially away from sleeve portion 138.

The sleeve portions (126, 128, 136, 138) may be sized such that an inner diameter thereof is large enough to provide a relatively tight fit with the rotatable shaft 100 when the sleeve portions are inserted onto the rotatable shaft 100. Thus, the inner diameter of the cylindrical sleeve portions may be slightly larger than the outer diameter of the rotatable shaft 100. Accordingly, the sleeve portions may be enabled to slide onto and off of the rotatable shaft 100 relatively easily, but provide a relatively snug fit therewith when the rotatable shaft 100 is fitted with any of the sleeve portions. As such, when being slid onto the rotatable shaft 100, the sleeve portions may generally be able to move freely in an axial direction until they reach some structural limit upon their movement axially. However, the sleeve portions may not have significant freedom to move radially.

In order to limit movement of the sleeve portions in the axial direction, and substantially fix the tine sub-assemblies in place for operation of the tiller 10 (and rotation of the rotatable shaft 100), inner and outer fixing members may be provided at corresponding portions of the rotatable shaft 100. In an example embodiment, a first inner fixing member 140 may be provided to set a limit for movement of the first sub-assembly 120 along the axial direction toward the sprocket 110. Meanwhile, a second inner fixing member 142 may be provided to set a limit for movement of the second sub-assembly 130 along the axial direction toward the sprocket 110 on the opposite side of the sprocket 110 relative to the first sub-assembly 120. In particular, the first and second inner fixing members 140 and 142 may be provided along the rotatable shaft 100 at positions that are equidistant from the center of the rotatable shaft 100 (and the sprocket 110 in this example) on opposite sides thereof. The second tine assembly 124 may be inserted onto the rotatable shaft 100 and slid inwardly toward the center (and the sprocket 110) until the sleeve portion 128 contacts the first inner fixing member 140. Meanwhile, the third tine assembly 132 may be inserted onto the rotatable shaft 100 and slid inwardly toward the center (and the sprocket 110) until the sleeve portion 136 contacts the second inner fixing member 142.

As shown in FIG. 3, the first and second inner fixing members 140 and 142 may be removable in some embodiments. For example, the first and second inner fixing members 140 and 142 may be removable pins configured to pass through a receiving orifice that is formed through the rotatable shaft along a direction substantially perpendicular to the axis of the rotatable shaft 100. To facilitate alternate fixing and removal of the first and second inner fixing members 140 and 142, the removable pins may have a head at one end that is larger than the diameter of the receiving orifice and a locking device such as a cotter pin and/or the like provided to be received by an orifice at the opposite end thereof to prevent removal of the first and second inner fixing members 140 and 142 when the pins are installed in their respective receiving orifices and the cotter pins are locked in place at the ends opposite the respective heads. In the example of FIG. 5, the cotter pins are spring type split pins, but any suitable alternative including any other type of locking device may be employed. Moreover, in some embodiments, the first and second inner fixing members 140 and 142 may not be removable. Instead, the first and second inner fixing members 140 and 142 may be embodied as fixed structures disposed on the surface of the rotatable shaft 100 to catch, lock, fix, or otherwise hold the corresponding sleeve portion of the tine assembly that is provided proximate thereto. In some alternative embodiments, the first and second inner fixing members 140 and 142 may be embodied as fixed detents, raised surfaces and/or the like that may be fixed on the rotatable shaft 100.

In some embodiments, not only may the first and second inner fixing members 140 and 142 prevent movement of the tine assemblies along the rotatable shaft 100 axially, but they may also facilitate holding the respective tine assemblies in place to prevent radial motion thereof when the rotatable shaft 100 turns. This may prevent the sleeve portions from slipping when the rotatable shaft 100 turns. Although prevention of radial motion may be provided by using a shape other than a cylindrical shape for the rotatable shaft 100 (e.g., a square, octagonal, or hexagonal), when the cylindrically shaped rotatable shaft 100 is employed, the first and second inner fixing members 140 and 142 may be employed to assist in prevention of rotation or slippage of the sleeve portions.

In an example embodiment, the sleeve portion 128 of the second tine assembly 124 may have a key slot 150 disposed at one end thereof. The key slot 150 may be configured to engage the first inner fixing member 140 to prevent rotation of the second tine assembly 124 when the rotatable shaft 100 turns. Likewise, the sleeve portion 136 of the third tine assembly 132 may include a key slot 152 disposed at one end thereof. The key slot 152 may be configured to engage the second inner fixing member 142 to prevent rotation of the third tine assembly 132 when the rotatable shaft 100 turns.

In an example embodiment, the sleeve portions within the same sub-assembly may be keyed or otherwise fitted together so that they are enabled to be held in place relative to one another when they are installed on the rotatable shaft 100. In the example of FIG. 3, the sleeve portion 126 of the first tine assembly 122 may include a first engagement portion 160 that is configured to fit together with a second engagement portion 162 of the sleeve portion 128 of the second tine assembly 124. In this example, the first engagement portion 160 includes an extended portion that extends in an axial direction farther than a corresponding retracted portion on the opposite side of the sleeve portion 124. Meanwhile, the second engagement portion 162 is shaped such that its extended portion fits with the retracted portion of the first engagement portion 160 and the retracted portion of the second engagement portion 162 fits with the extended portion of the first engagement portion 160 so that a relatively tight fit between the two sleeve portions may be provided when they are proximate to each other on the rotatable shaft 100. Although FIGS. 2 and 3 show the first and second engagement portions 160 and 162 having relatively smooth transitions between their respective extended and retracted portions, it should be appreciated that the extended and retracted portions may have sharper angles defining them in some alternative embodiments.

With respect to the first sub-assembly 120, it should be appreciated that when the sleeve portion 128 of the second tine assembly 124 is installed on the rotatable shaft 100 to the point where the key slot 150 engages the first inner fixing member 140, the second tine assembly 124 will be prevented from sliding or rotating radially, and will be prevented from moving any further in the axial direction toward the sprocket 110. However, the second tine assembly 124 may be moved axially away from the sprocket 110. Moreover, after the engagement between the key slot 150 and the first inner fixing member 140 is broken, the second tine assembly 124 may also rotate on the rotatable shaft 100.

When the key slot 150 engages the first inner fixing member 140, and the first tine assembly 122 is brought into contact with the second tine assembly 124, the first engagement portion 160 and the second engagement portion 162 may contact or engage each other. Engagement of the first and second engagement portions 160 and 162 may prevent the first tine assembly 122 from moving axially inward toward the sprocket 110 and prevent the first tine assembly 122 from rotating relative to the rotatable shaft 100. However, unless the end of the sleeve portion 126 of the first tine assembly 122 that is opposite with respect to the first engagement portion 160 (i.e., the distal end of the first tine assembly 122, which is also the distal end of the first sub-assembly 120) is fixed in some way, the first tine assembly 122 (and thereafter also the second tine assembly 124) may be moved away from the sprocket 110 along the axial direction and perhaps be removed from the rotatable shaft 100.

It should be further noted that when the distal end of the first tine assembly 122 is not fixed, enablement for relatively easy removal of the first tine assembly 122 (and if desired also the second tine assembly 124) may allow the operator to remove the tine assemblies for cleaning and/or maintenance. Thus, for example, if roots, mud or other material foul the tine assemblies, the operator may be enabled to easily remove the tine assemblies to clean them. However, some embodiments may further enable the distal end of the first tine assembly 122 to be selectively locked using a mechanism that can be removed by the operator without any requirement for tools.

As shown in FIGS. 2 and 3, the distal end of the first tine assembly 122 may be provided with a mechanism to enable selective locking of the entire first sub-assembly 120 onto the rotatable shaft 100. The second sub-assembly 130 may have a similar mechanism for enabling selective locking thereof as well. The mechanism for selective locking and unlocking of the sub-assemblies of the rotating assembly 50 may include a removable pin disposed at the distal ends of each respective sub-assembly. The removable pin may engage a locking slot at the distal end of each respective sub-assembly.

In the example of FIGS. 2 and 3, the first sub-assembly 120 may include a locking slot 170 that is disposed at the distal end of the sleeve portion 126 of the first tine assembly 122. The locking slot 170 may be configured to receive a removable locking pin 172 that may be configured to fit through a receiving opening proximate to a distal end of the rotatable shaft 100. When the locking pin 172 is installed into the receiving opening, the locking pin 172 may engage the locking slot 170 to prevent axial motion of the first tine assembly 122 (and the second tine assembly 124) away from the sprocket 110. The engagement between the locking pin 172 and the locking slot 170 may further facilitate, in combination with the engagement between the key slot 150 and the first inner fixing member 140, holding of the first and second tine assemblies 122 and 124 to prevent sliding when the rotatable shaft 100 turns. Thus, the engagement between the locking pin 172 and the locking slot 170 and the engagement between the key slot 150 and the first inner fixing member 140 may cause the first sub-assembly 120 to move with the rotatable shaft 100.

As shown in FIG. 3, the locking slot 170 may have similar characteristics to those described above for the key slot 150. Similarly, the locking pin 170 may have a similar structure and similar characteristics to those described above in relation to the depicted embodiment of the first inner fixing member 140. Accordingly, the locking pin 170 may be a pin configured to pass through a receiving opening disposed proximate to a distal end of the rotatable shaft 100 so that the locking pin 170 is relatively easily accessible to an operator at a side of the tiller 10. A head of the locking pin 170 may prevent the locking pin 170 from passing through the receiving opening. However, the other end of the locking pin 170 may include an orifice through which a locking device such as, for example, cotter pin 174 and/or the like may be provided. When the cotter pin 174 (e.g., a spring type split pin) is removed by the operator, without needing tools, the locking pin 170 may then be removable from the receiving opening to allow removal of the first tine assembly 122 from the rotatable shaft 100. In the depicted embodiment, the receiving slots may all pass through the rotatable shaft parallel to each other. However, other orientations are also possible.

Some embodiments may therefore enable easy removal of the sub-assemblies of the rotating assembly 50 to clear fouling thereof. However, as indicated above, tine sets of the rotatable assembly 50 may be constructed and/or formed in various different ways. Thus, for example, some tine sets may be tailored for use with corresponding specific soil types or soil conditions. By providing a relatively easy way to remove tine assemblies, some example embodiments may enable operators to change to a tine assembly that is suited for current conditions without requiring the use of tools or any complex mechanical operations. Additionally or alternatively, the tine sets could be removed and installed in reverse for interchangeable operation regardless of the style of tiller used (e.g., rear or front tiller).

In an example embodiment, one or more sets of tines may be affixed to a hollow shaft (e.g., the sleeve portions 126, 128, 136, 138). The hollow shaft may be slidable over a rotatable shaft to form a rotating assembly for working ground responsive to operation of a tiller when the rotating assembly is selectively coupled to an engine of the tiller. The rotatable shaft may be configured to turn when the rotation assembly is selectively coupled to the engine. The one or more sets of tines may extend radially outward from the respective tine assemblies. In some embodiments, the rotating assembly includes at least a first tine assembly and a second tine assembly and the first and second tine assemblies each include a respective sleeve portion defining the hollow shaft. In such an embodiment, the first and second tine assemblies may be configured for engagement with each other at adjacent ends of the respective sleeve portions. In some cases, an end of the first tine assembly that is opposite the second tine assembly engages an inner fixing member disposed on the rotatable shaft to prevent rotation of the first tine assembly relative to the rotatable shaft. In some cases, a key slot may be disposed in a sleeve portion of the first tine assembly at the end of the first tine assembly that is opposite the second tine assembly and the key slot may engage the inner fixing member. In an example embodiment, inner fixing member includes a head at one end thereof, and receives a removable locking device such as a cotter pin at an opposite end thereof. The inner fixing member may pass entirely through the rotatable shaft and the sleeve portion of the first tine assembly. In some cases, an end of the second tine assembly that is opposite the first tine assembly includes a locking slot configured to engage a locking pin responsive to insertion of the locking pin into a receiving opening disposed at an end portion of the rotatable shaft. In such an example, the locking pin includes a head at one end thereof, and receives a locking device such as a cotter pin at an opposite end thereof. The cotter pin may be removable without tools (e.g., a spring type split pin). In some cases, any or all of the modifications describe above may be employed together or separately. Moreover, in some cases, the modification (together or separate) may further include provision of the tine assemblies so that they are alternately fixable and releasable relative to the rotatable shaft without requiring a tool. Furthermore, in some cases, the rotatable shaft may be selectively coupled to the engine via a sprocket disposed at a center of the rotatable shaft, and a plurality of tine assemblies may be provided on each side of the sprocket to form the rotating assembly. In an example embodiment, rotation of the hollow shaft relative to the rotatable shaft is prevented when the hollow shaft is installed onto the rotatable shaft, and movement of the hollow shaft along an axis of the rotatable shaft is alternately enabled and disabled.

Figure 4:
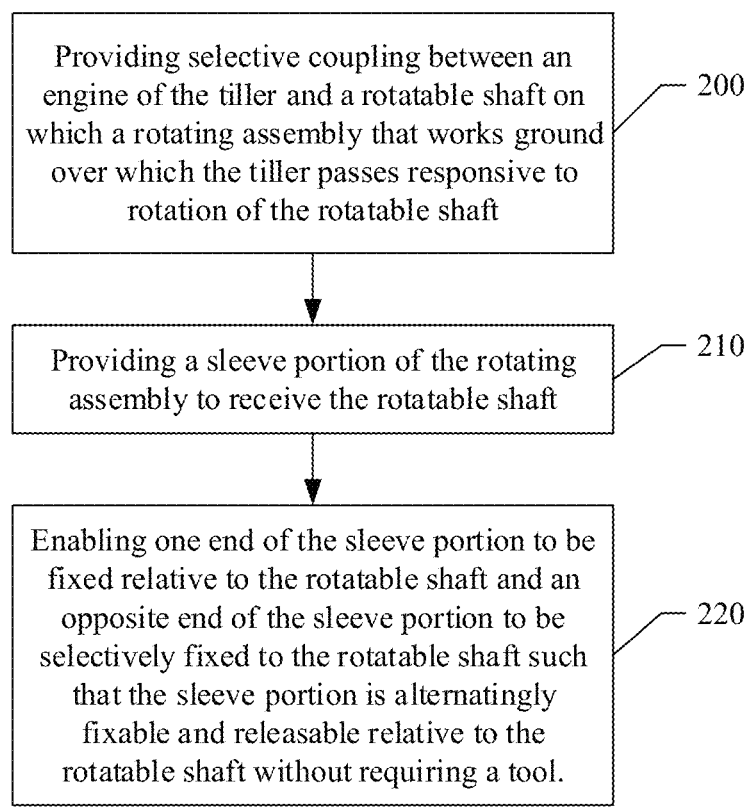
FIG. 4 illustrates a block diagram of a method of providing a tiller with removable tine assemblies according to an example embodiment.

FIG. 4 illustrates a block diagram of a method of providing a tiller with removable tine assemblies according to an example embodiment. The method may include providing selective coupling between an engine of the tiller and a rotatable shaft on which a rotating assembly that works ground over which the tiller passes responsive to rotation of the rotatable shaft at operation 200. The method may further include providing a sleeve portion of the rotating assembly to receive the rotatable shaft at operation 210. The sleeve portion may have one or more sets of tines extending radially outward therefrom. The method may further include enabling one end of the sleeve portion to be fixed relative to the rotatable shaft and an opposite end of the sleeve portion to be selectively fixed to the rotatable shaft such that the sleeve portion is alternately fixable and releasable relative to the rotatable shaft without requiring a tool at operation 220.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tiller comprising:
    an engine;
    a mobility assembly operably coupled to the engine to provide mobility of the tiller responsive to operation of the engine; and
    a rotating assembly operably coupled to the engine to provide rotation of the rotating assembly responsive to operation of the engine, the rotating assembly comprising:
    a rotatable shaft configured to turn responsive to operation of the engine, and
    a first tine assembly and a second tine assembly, each of the tine assemblies comprising one or more sets of tines disposed thereon, each of the first and second tine assemblies comprising a respective sleeve portion defining a hollow shaft for receiving the rotatable shaft, the first and second tine assemblies being configured to axially couple with each other at adjacent ends of the respective sleeve portions and ends of the respective sleeve portions of the first tine assembly and second tine assembly opposite the second tine assembly and the first tine assembly, respectively, are operably coupled to the rotatable shaft, such that rotation between the rotatable shaft, the first tine assembly, and the second tine assembly is prevented,
    wherein the one or more sets of tines extend radially outward from the respective tine assemblies.

2. The tiller of claim 1, wherein the end of the sleeve portion of the first tine assembly that is opposite the second tine assembly engages an inner fixing member disposed on the rotatable shaft to prevent rotation of the first tine assembly relative to the rotatable shaft.

3. The tiller of claim 2, wherein a key slot is disposed in the sleeve portion of the first tine assembly at the end of the sleeve portion of the first tine assembly that is opposite the second tine assembly, the key slot engaging the inner fixing member.

4. The tiller of claim 3, wherein the inner fixing member comprises a head at one end thereof, and receives a removable locking device at an opposite end thereof, the inner fixing member passing entirely through the rotatable shaft and the sleeve portion of the first tine assembly.

5. The tiller of claim 2, wherein the end of the sleeve portion of the second tine assembly that is opposite the first tine assembly comprises a locking slot configured to engage a locking pin responsive to insertion of the locking pin into a receiving opening disposed at an end portion of the rotatable shaft.

6. The tiller of claim 5, wherein the locking pin comprises a head at one end thereof, and receives a locking device at an opposite end thereof, the locking device being removable without tools.

7. The tiller of claim 6, wherein the locking device comprises a spring type split pin.

8. The tiller of claim 1, wherein the tine assemblies are alternately fixable and releasable relative to the rotatable shaft without requiring a tool.

9. The tiller of claim 1, wherein the rotatable shaft is operably coupled to the engine via a sprocket disposed at a center of the rotatable shaft, and wherein a plurality of tine assemblies are provided on each side of the sprocket to form the rotating assembly.

10. The tiller of claim 1, wherein rotation of the hollow shaft relative to the rotatable shaft is prevented when the hollow shaft is installed onto the rotatable shaft, and wherein movement of the hollow shaft along an axis of the rotatable shaft is alternately enabled and disabled by a respective installation and removal of one or more fixing members.

11. The tiller of claim 1, wherein the ends of the respective sleeve portions of the first tine assembly and the second tine assembly that are opposite the second tine assembly and the first tine assembly, respectively, engage a fixing member disposed on the rotatable shaft to prevent rotation of the first tine assembly and the second tine assembly relative to the rotatable shaft, and
    wherein adjacent ends of the respective sleeve portions of the first tine assembly and the second tine assembly comprise an engagement portion configured to axially couple the adjacent ends of the respective sleeve portions of the first tine assembly and the second tine assembly.

12. The tiller of claim 11, wherein the engagement portion of the first tine assembly includes an extended portion and the second tine assembly includes a complementary retracted portion, such that the extended portion fits within the retracted portion when the first tine assembly is engaged with the second tine assembly.

13. A rotating assembly for working ground responsive to operation of a tiller when the rotating assembly is operably coupled to an engine of the tiller, the rotating assembly comprising:
    a rotatable shaft configured to turn responsive to operation of the engine, and
    a first tine assembly and a second tine assembly, each of the tine assemblies comprising one or more sets of tines disposed thereon, each of the first and second tine assemblies comprising a respective sleeve portion defining a hollow shaft for receiving the rotatable shaft, the first and second tine assemblies being configured to axially couple with each other at adjacent ends of the respective sleeve portions and ends of the respective sleeve portions of the first tine assembly and second tine assembly opposite the second tine assembly and the first tine assembly, respectively, are operably coupled to the rotatable shaft, such that rotation between the rotatable shaft, the first tine assembly, and the second tine assembly is prevented,
    wherein the one or more sets of tines extend radially outward from the respective tine assemblies.

14. The rotating assembly of claim 13, wherein the end of the sleeve portion of the first tine assembly that is opposite the second tine assembly engages an inner fixing member disposed on the rotatable shaft to prevent rotation of the first tine assembly relative to the rotatable shaft.

15. The rotating assembly of claim 14, wherein a key slot is disposed in the sleeve portion of the first tine assembly at the end of the sleeve portion of the first tine assembly that is opposite the second tine assembly, the key slot engaging the inner fixing member.

16. The rotating assembly of claim 15, wherein the inner fixing member comprises a head at one end thereof, and receives a removable locking device at an opposite end thereof, the inner fixing member passing entirely through the rotatable shaft and the sleeve portion of the first tine assembly.

17. The rotating assembly of claim 14, wherein the end of the sleeve portion of the second tine assembly that is opposite the first tine assembly comprises a locking slot configured to engage a locking pin responsive to insertion of the locking pin into a receiving opening disposed at an end portion of the rotatable shaft.

18. The rotating assembly of claim 17, wherein the locking pin comprises a head at one end thereof, and receives a locking device at an opposite end thereof, the locking device being removable without tools.

19. The rotating assembly of claim 18, wherein the locking device is a spring type split pin.

20. A method of providing a tiller with removable tine assemblies, the method comprising:
providing operative coupling between an engine of the tiller and a rotatable shaft to provide rotation of the rotating assembly responsive to operation of the engine, wherein rotation of the rotating assembly works ground over which the tiller;
providing a first tine assembly and a second tine assembly each comprising a respective sleeve portion defining a hallow shaft of the rotating assembly to receive the rotatable shaft, the respective sleeve portions having one or more sets of tines extending radially outward therefrom, the first and second tine assemblies being configured to axially couple with each other at adjacent ends of the respective sleeve portions and ends of the respective sleeve portions of the first tine assembly and second tine assembly opposite the second tine assembly and the first tine assembly, respectively, are operably coupled to the rotatable shaft, such that rotation between the rotatable shaft, the first tine assembly, and the second tine assembly is prevented; and
enabling one end of the respective sleeve portions to be fixed relative to the rotatable shaft and an opposite end of the respective sleeve portions to be selectively fixed to the rotatable shaft, such that the sleeve portion is alternately fixable and releasable relative to the rotatable shaft without requiring a tool.

* * * * *